United States Patent
Burdette et al.

(10) Patent No.: US 11,346,228 B1
(45) Date of Patent: May 31, 2022

(54) AIRFOIL WITH FLANGE FORMED OF WISHBONE-SHAPED FIBER LAYER STRUCTURE

(71) Applicant: RAYTHEON TECHNOLOGIES CORPORATION, Farmington, CT (US)

(72) Inventors: Alyson T. Burdette, Gilbertsville, PA (US); Bryan P. Dube, Columbia, CT (US); Howard J. Liles, Newington, CT (US); James T. Roach, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/182,389

(22) Filed: Feb. 23, 2021

(51) Int. Cl.
    *F01D 5/14* (2006.01)
    *F01D 9/04* (2006.01)
    *B29B 11/16* (2006.01)
    *D03D 25/00* (2006.01)

(52) U.S. Cl.
    CPC .............. *F01D 5/147* (2013.01); *B29B 11/16* (2013.01); *D03D 25/005* (2013.01); *F01D 9/041* (2013.01); *F05D 2220/32* (2013.01); *F05D 2240/12* (2013.01)

(58) Field of Classification Search
CPC ......... F01D 5/147; F01D 9/041; B29B 11/16; D03D 25/005; F05D 2220/32; F05D 2240/12
See application file for complete search history.

(56) References Cited

U.S. PATENT DOCUMENTS

| | | | |
|---|---|---|---|
| 9,062,562 B2 | 6/2015 | Coupe et al. | |
| 9,308,708 B2* | 4/2016 | Kleinow | B32B 18/00 |
| 9,664,053 B2 | 5/2017 | Marshall et al. | |
| 9,708,918 B2 | 7/2017 | Fremont et al. | |
| 10,724,387 B2* | 7/2020 | Farrar | F01D 5/147 |
| 11,208,198 B2* | 12/2021 | Courtier | D03D 1/00 |
| 2007/0248780 A1 | 10/2007 | Schober et al. | |
| 2019/0323357 A1* | 10/2019 | Courtier | F01D 5/147 |
| 2019/0390555 A1* | 12/2019 | Kline | B29C 70/34 |

OTHER PUBLICATIONS

Calomino, A. and Verrilli, M. (2004). Ceramic matrix composite vane subelement fabrication. Proceedings of ASME Turbo Expo 2004. Jun. 14-17, 2004. pp. 1-7.

* cited by examiner

*Primary Examiner* — Michael Lebentritt
*Assistant Examiner* — Brian Christopher Delrue
(74) *Attorney, Agent, or Firm* — Carlson, Gaskey & Olds, P.C.

(57) ABSTRACT

A vane arc segment includes an airfoil fairing that has a fairing platform and an airfoil section that extends there from. The fairing platform defines a gaspath side and a non-gaspath side and includes a flange that projects from the non-gaspath side. The airfoil fairing is formed of a fiber-reinforced composite that includes a wishbone-shaped fiber layer structure that has first and second arms that converge and merge into a single leg. The first and second arms are formed of fiber plies comprised of a network of fiber tows. The single leg comprises fiber tows from each of the fiber plies of the first and second arms. The fiber tows of the first arm are interwoven in the single leg with the fiber tows of the second arm. The first arm, the second arm, or the single leg forms at least a portion of the flange.

20 Claims, 7 Drawing Sheets

AIRFOIL WITH FLANGE FORMED OF WISHBONE-SHAPED FIBER LAYER STRUCTURE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes an airfoil fairing having a fairing platform and an airfoil section extending there from. The fairing platform defines a gaspath side and a non-gaspath side. The fairing platform includes a flange projecting from the non-gaspath side. The airfoil fairing is formed of a fiber-reinforced composite including a wishbone-shaped fiber layer structure having first and second arms that converge and merge into a single leg. The first and second arms are formed of fiber plies comprised of a network of fiber tows. The single leg comprises fiber tows from each of the fiber plies of the first and second arms. The fiber tows of the first arm are interwoven in the single leg with the fiber tows of the second arm. The first arm, the second arm, or the single leg form at least a portion of the flange.

In a further embodiment of any of the foregoing embodiments, the single leg forms at least a portion of the flange.

In a further embodiment of any of the foregoing embodiments, the first arm forms at least a portion of the flange and the single leg is in the fairing platform.

In a further embodiment of any of the foregoing embodiments, the airfoil section includes an internal cavity. The fiber-reinforced composite includes cavity fiber plies that circumscribe the internal cavity so as to define a full circumferential border thereof, and at least a portion of the cavity plies have ends that abut the single leg in the fairing platform.

In a further embodiment of any of the foregoing embodiments, the first and second arms merge in the fairing platform.

In a further embodiment of any of the foregoing embodiments, the airfoil section includes an internal cavity. The fiber-reinforced composite includes cavity fiber plies that circumscribe the internal cavity so as to define a full circumferential border thereof, and at least a portion of the cavity fiber plies extend into the fairing platform and turn to form a portion of the flange.

In a further embodiment of any of the foregoing embodiments, at least one of the cavity fiber plies extends into the fairing platform and bypasses the flange.

In a further embodiment of any of the foregoing embodiments, the first arm is interleaved in the fairing platform with the cavity fiber plies.

In a further embodiment of any of the foregoing embodiments, the fiber-reinforced composite includes at least one over-braid fiber ply that circumscribes the airfoil section and turns from the airfoil section into the fairing platform.

In a further embodiment of any of the foregoing embodiments, the fiber-reinforced composite further includes at least one cover ply that forms a portion of the flange and that turns from the flange into the fairing platform.

In a further embodiment of any of the foregoing embodiments, at least one of the cavity fiber plies terminates short of the fairing platform.

In a further embodiment of any of the foregoing embodiments, the airfoil section includes an internal cavity and the fiber-reinforced composite includes at least one cover ply and cavity fiber plies. The at least one cover ply forms a portion of the flange, turns from the flange into the fairing platform, and terminates at a cover ply terminal end. The cavity fiber plies circumscribe the internal cavity so as to define a full circumferential border thereof, and one of the cavity plies extends into the fairing platform and terminates at a cavity fiber ply terminal end that abuts the cover ply terminal end.

A gas turbine engine according to an example of the present disclosure includes a compressor section, a combustor in fluid communication with the compressor section, and a turbine section in fluid communication with the combustor. The turbine section has vane arc segments disposed about a central axis of the gas turbine engine. Each of the vane arc segments includes an airfoil fairing having a fairing platform and an airfoil section extending there from. The fairing platform defines a gaspath side and a non-gaspath side. The fairing platform includes a flange projecting from the non-gaspath side. The airfoil fairing is formed of a fiber-reinforced composite including a wishbone-shaped fiber layer structure having first and second arms that converge and merge into a single leg. The first and second arms are formed of fiber plies comprised of a network of fiber tows. The single leg comprises fiber tows from each of the fiber plies of the first and second arms. The fiber tows of the first arm re interwoven in the single leg with the fiber tows of the second arm. The first arm, the second arm, or the single leg form at least a portion of the flange.

In a further embodiment of any of the foregoing embodiments, the single leg forms at least a portion of the flange.

In a further embodiment of any of the foregoing embodiments, the first arm forms at least a portion of the flange and the single leg is in the fairing platform.

In a further embodiment of any of the foregoing embodiments, the airfoil section includes an internal cavity. The fiber-reinforced composite includes cavity fiber plies that circumscribe the internal cavity so as to define a full circumferential border thereof, and at least a portion of the cavity plies have ends that abut the single leg in the fairing platform.

In a further embodiment of any of the foregoing embodiments, the airfoil section includes an internal cavity. The fiber-reinforced composite includes cavity fiber plies that circumscribe the internal cavity so as to define a full circumferential border thereof, and at least a portion of the cavity fiber plies extend into the fairing platform and turn to form a portion of the flange.

In a further embodiment of any of the foregoing embodiments, at least one of the cavity fiber plies extends into the fairing platform and bypasses the flange.

In a further embodiment of any of the foregoing embodiments, the first arm is interleaved in the fairing platform with the cavity fiber plies.

In a further embodiment of any of the foregoing embodiments, the airfoil section includes an internal cavity and the fiber-reinforced composite includes at least one cover ply and cavity fiber plies. The at least one cover ply forms a portion of the flange, turns from the flange into the fairing platform, and terminates at a cover ply terminal end. The cavity fiber plies circumscribe the internal cavity so as to define a full circumferential border thereof, and one of the cavity plies extends into the fairing platform and terminates at a cavity fiber ply terminal end that abuts the cover ply terminal end.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
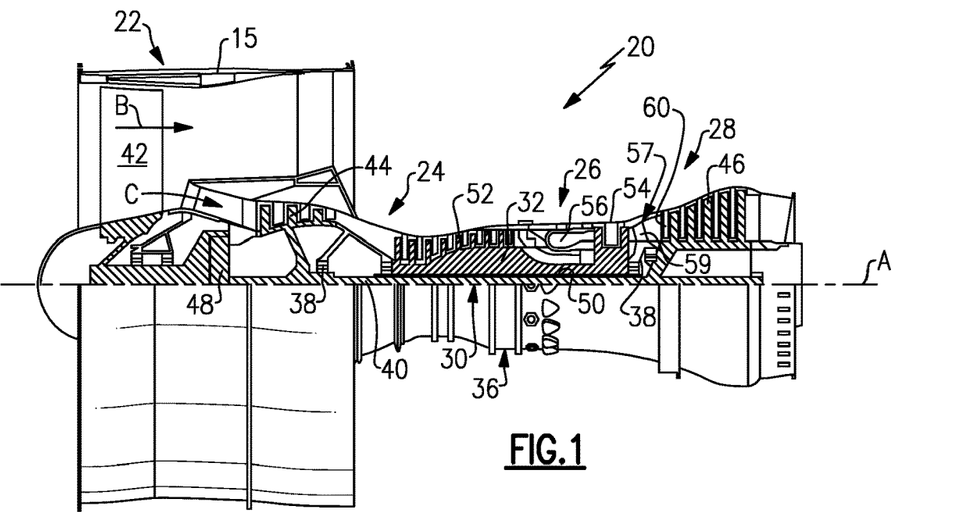
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

Figure 2:
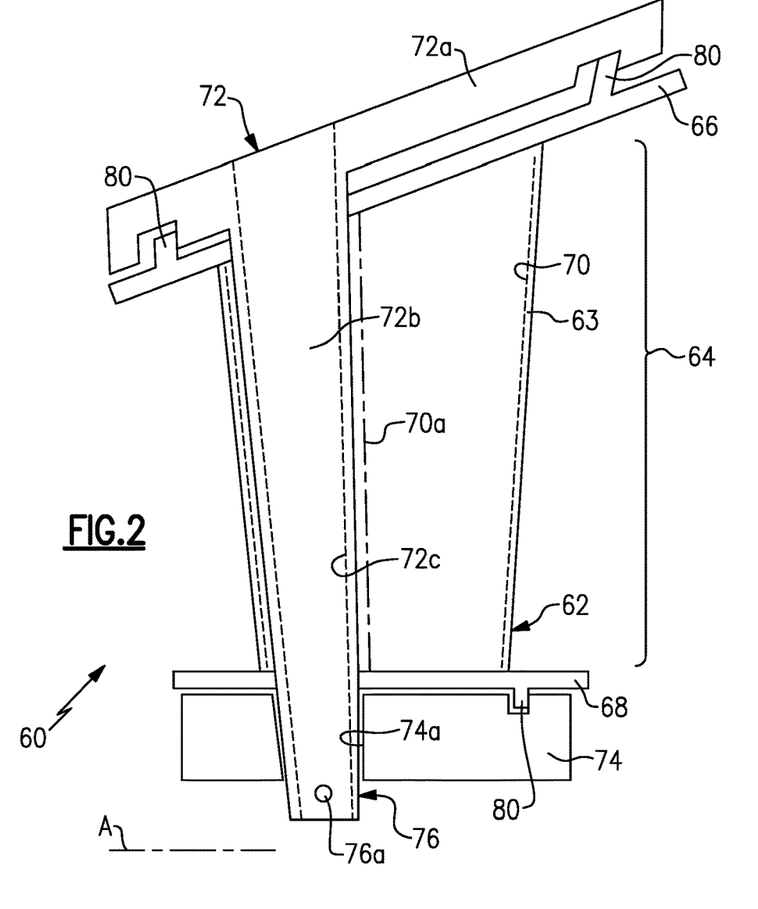
FIG. 2 illustrates a vane arc segment of the gas turbine engine.

FIG. 2 illustrates a line representation of an example of a vane arc segment 60 from the turbine section 28 of the engine 20 (see also FIG. 1). It is to be understood that although the examples herein are discussed in context of a vane from the turbine section, the examples can be applied to vanes in other portions of the engine 20.

The vane arc segment 60 includes an airfoil fairing 62 that is formed by an airfoil wall 63. The airfoil fairing 62 is comprised of an airfoil section 64 and first and second platforms 66/68 between which the airfoil section 64 extends. The airfoil section 64 generally extends in a radial direction relative to the central engine axis A. The terms such as "inner" and "outer" refer to location with respect to the central engine axis A, i.e., radially inner or radially outer. It is to be understood that although the illustrated airfoil fairing 62 has two platforms 66/68, the airfoil fairing 62 may alternatively have only a single platform 66 or 68 and the other platform may be provided as a separate piece. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The airfoil wall 63 is continuous in that the platforms 66/68 and airfoil section 64 constitute a unitary body. As an example, the airfoil wall 63 is formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

The airfoil section 64 circumscribes an interior cavity 70, which in this example is subdivided by a rib 70a. Alternatively, the airfoil section 64 may have a single cavity 70, or the cavity 70 may be divided by additional ribs. The vane arc segment 60 further includes a spar 72 that extends through the cavity 70 and mechanically supports the airfoil fairing 62. The spar 72 includes a spar platform 72a and a spar leg 72b that extends from the spar platform 72a into the cavity 70. Although not shown, the radially outer side of the spar platform 72a may include attachment features that secure it to a fixed support structure, such as an engine case. The spar leg 72b defines an interior through-passage 72c.

The end of the spar leg 72b extends past the platform 68 of the airfoil fairing 62 so as to protrude from the fairing 62. There is a support platform 74 adjacent the platform 68 of the airfoil fairing 62. The support platform 74 includes a through-hole 74a through which the end of the spar leg 72b extends. The end of the spar leg 72b includes a clevis mount 76 in this example, although other mounting schemes can alternatively be used. At least a portion of the clevis mount 76 protrudes from the support platform 74. A pin 76a extends though the clevis mount 76. The pin 76a is wider than the through-hole 74a. The ends of the pin 76a thus abut the face of the support platform 74 and thereby prevent the spar leg 72b from being retracted in the through-hole 74a. The pin 76a thus locks the support platform 74 to the spar leg 72b such that the airfoil fairing 62 is mechanically trapped between the spar platform 72a and the support platform 74. It is to be appreciated that the example configuration could be used at the outer end of the airfoil fairing 62, with the spar 72 being inverted such that the spar platform 72a is adjacent the platform 68 and the support platform 74 is adjacent the platform 66. The spar 72 may be formed of a relatively high temperature resistance, high strength material, such as a single crystal metal alloy (e.g., a single crystal nickel- or cobalt-alloy).

Figure 3:
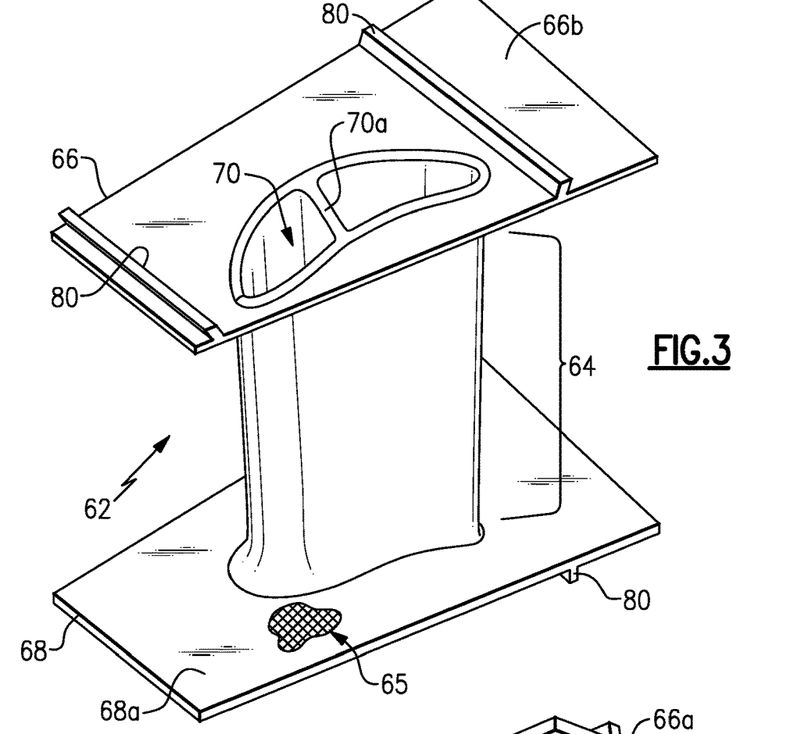
FIG. 3 illustrates a first view of an airfoil fairing of the vane arc segment.
Figure 4:
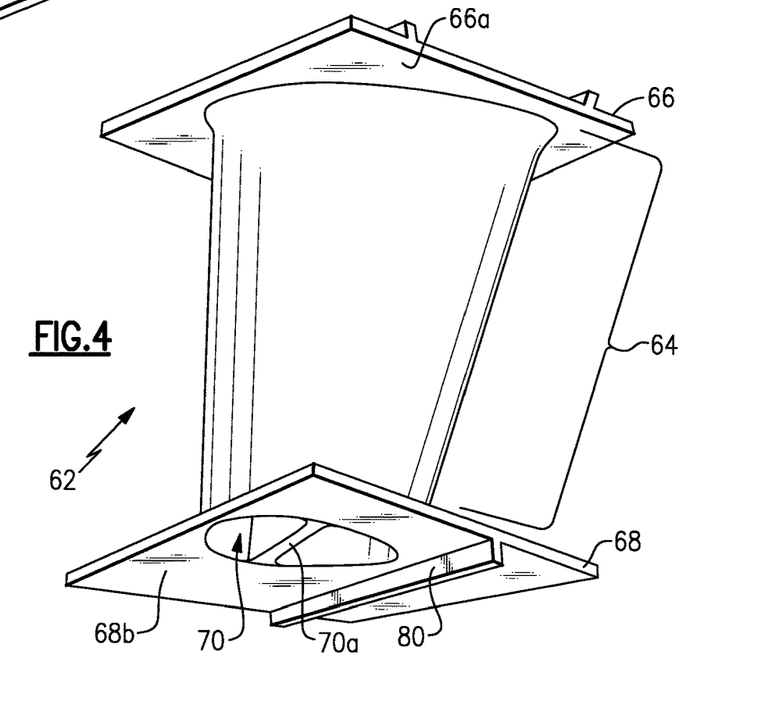
FIG. 4 illustrates a second view of the airfoil fairing.

Referring also to FIGS. 3 and 4 that illustrate isolated views of the airfoil fairing 62, each of the platforms 66/68 defines a respective gaspath side 66a/68a and a non-gaspath side 66b/68b. The gaspath side 66a/68a here refers to the core gaspath of the engine 20. The non-gaspath side 66b/68b of at least one of the platforms 66/68 includes a flange 80. In the illustrated example, the (outer) platform 66 has two flanges 80, one of which is a forward flange and the other of which is an aft flange. The platform 68 has a single flange 80 located toward the aft end thereof. The flanges 80 serve to mount the airfoil fairing 62. For instance, as shown in FIG. 2, the flanges 80 are received into corresponding channels in the spar platform 72a and support platform 74. Aerodynamic, thermal, and structural loads may be reacted through the flanges 80 to the spar platform 72a and/or support platform 74.

The use of fiber-reinforced composites in an airfoil fairing presents challenges for attachment in a gas turbine engine. In an airfoil that is formed of a metallic superalloy, the superalloy is strong and can be cast with relatively complex geometry attachment features. Fiber-reinforced composites such as CMCs, however, have lower material stress limits in comparison to high strength superalloys used for some vane segments. Thus, support schemes designed for metal alloys that utilize hooks or a series of rails can concentrate stresses and/or create thermal stresses which may exceed material limits of composites. Moreover, hooks and rails often have complex geometries that are challenging to manufacture of composite material. Therefore, even though composites may have many potential benefits, such benefits cannot be realized without a suitable support scheme. In this regard, as will be described further below, the flange or flanges 80 facilitate good strength and manufacturability while serving as a relatively simple attachment feature.

Figure 5A:
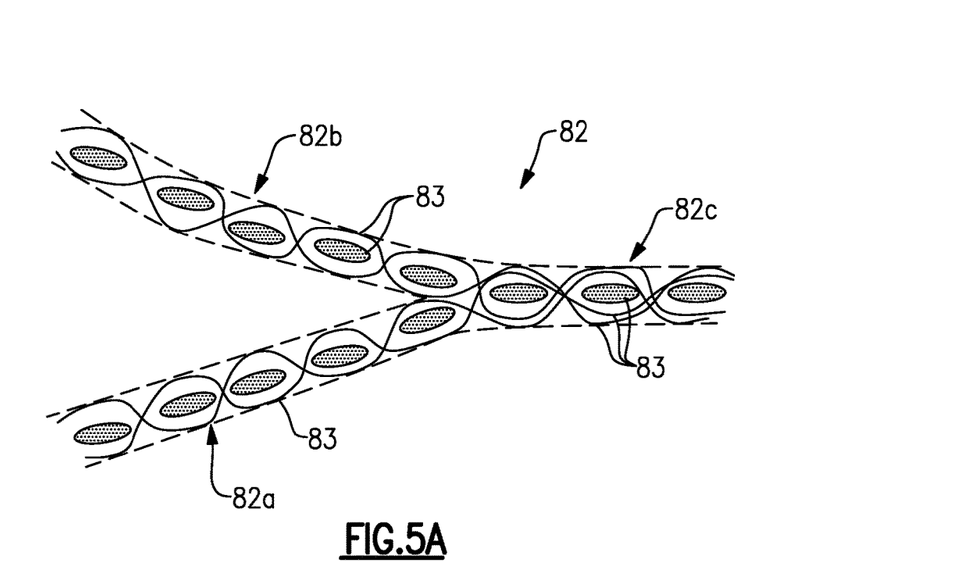
FIG. 5A illustrates an example wishbone-shaped fiber structure.

The airfoil fairing 62 is fabricated of a fiber-reinforced composite 65 (shown in partial cutaway view in FIG. 3) that includes a wishbone-shaped fiber layer structure that forms a portion of one of the flanges 80. An example wishbone-shaped fiber layer structure 82 is shown in an isolated view in FIG. 5A. The structure 82 has first and second arms 82a/82b that converge and merge into a single leg 82c. Each of the first and second arms 82a/82b are formed of one or more fiber plies and each fiber ply is comprised of a network of fiber tows 83 (warp and weft tows shown). In the example shown, each of the arms 82a/82b is a single ply, but it is to be understood that each arm 82a/82b may alternatively have multiple plies and equal or unequal numbers of plies. The single leg 82c includes fiber tows 83 from each of the fiber plies of the first and second arms 82a/82b. The fiber tows 82 of the first arm 82a are interwoven in the single leg 82c with the fiber tows 83 of the second arm 82b.

Figure 5B:
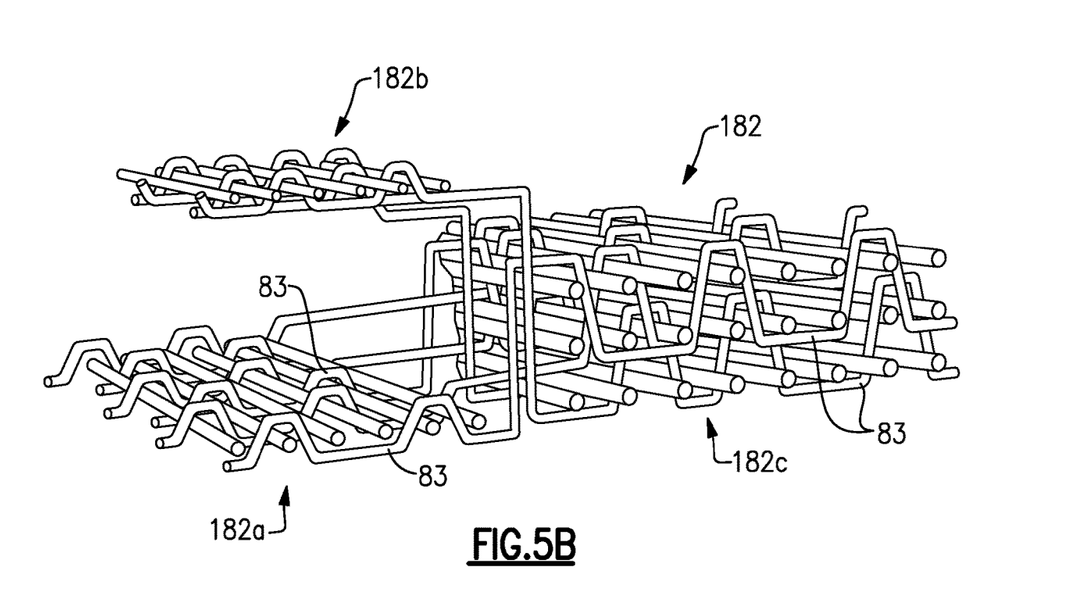
FIG. 5B illustrates another example wishbone-shaped fiber structure.

FIG. 5B shows another example wishbone-shaped fiber layer structure 182 that can alternatively be used in any of the examples herein. In the prior example the fiber layers 82a/82b are woven into a 2D single leg 82c layer. In this example, however, the fiber layers 182a/182b are woven into a 3D single leg 182c. It is to be appreciated that the illustrated fiber architectures are non-limiting examples and that other fiber architectures may alternatively be used in the wishbone structure.

Figure 6:
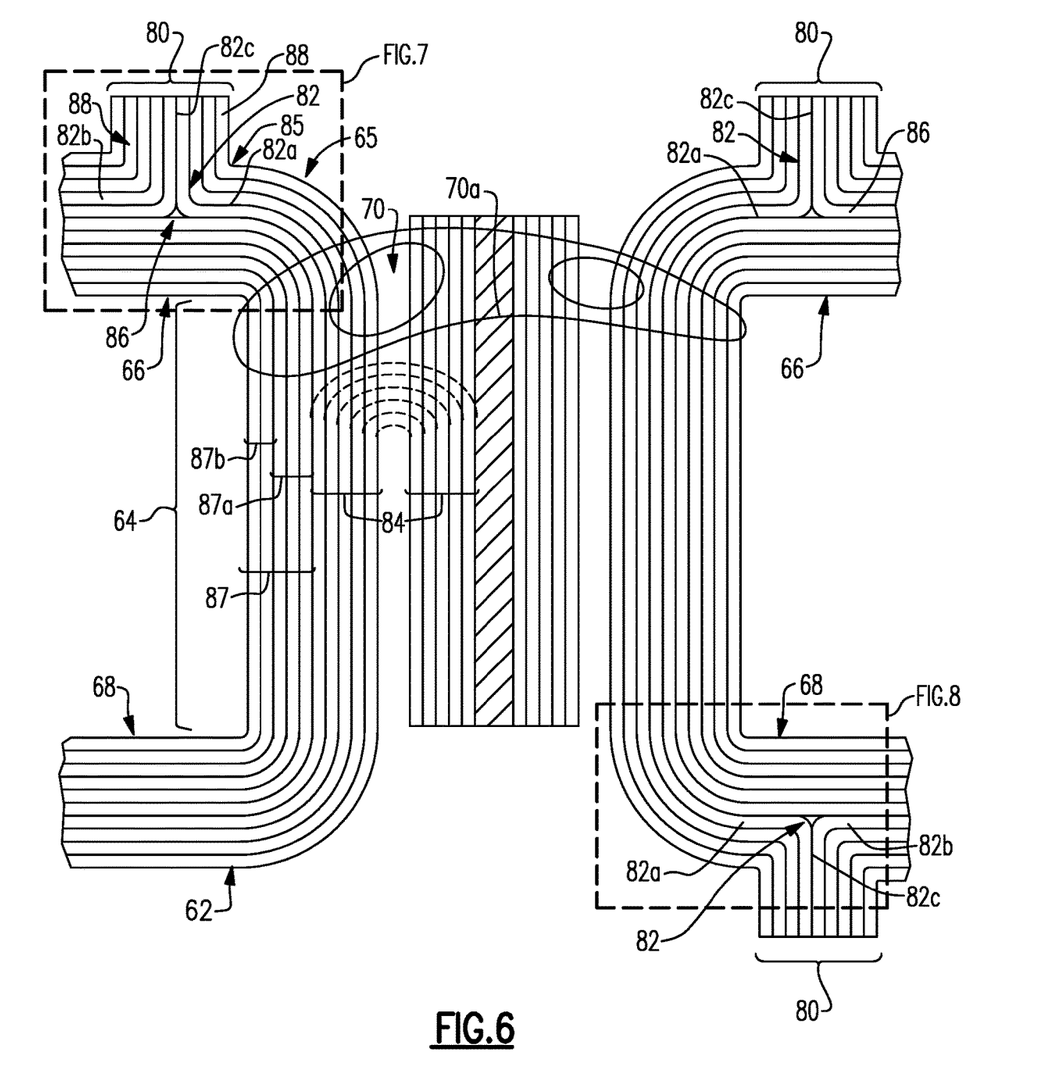
FIG. 6 illustrates a fiber ply architecture of an airfoil fairing.

FIG. 6 illustrates a sectioned representation of the airfoil fairing 62 that shows the layered ply architecture of the fiber-reinforced composite 65. For additional context, the profile of the airfoil section 64 is also superimposed on the architecture. Again, although the illustrated example has three flanges 80, alternate embodiments may have fewer or additional flanges 80.

Figure 7:
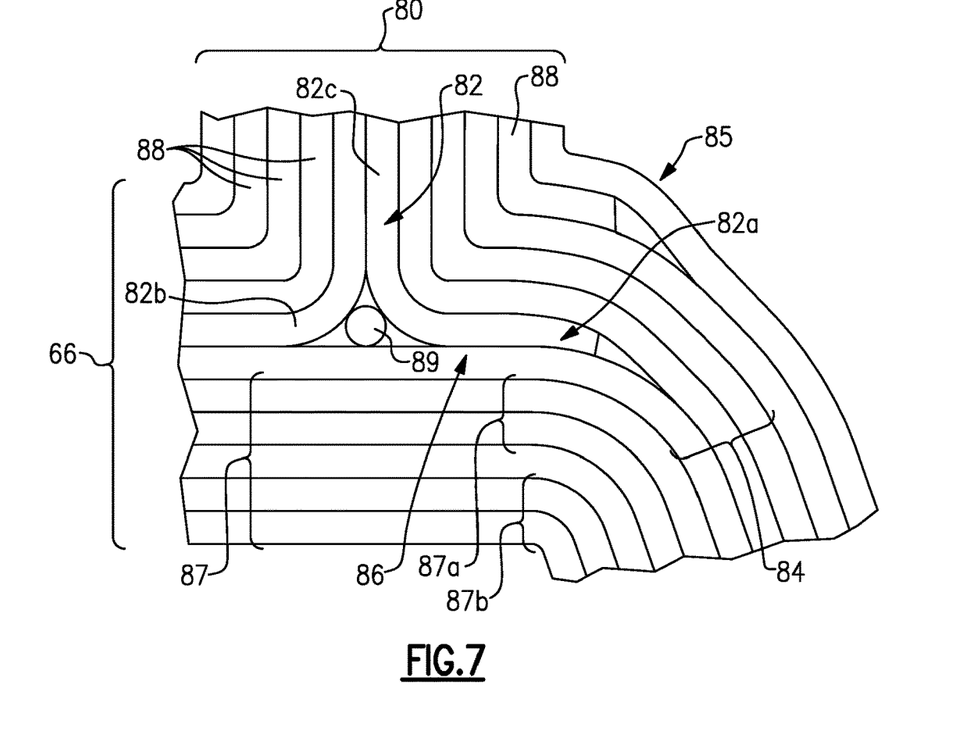
FIG. 7 illustrates a closer view of the fiber ply architecture of a flange of an airfoil fairing.
Figure 8:
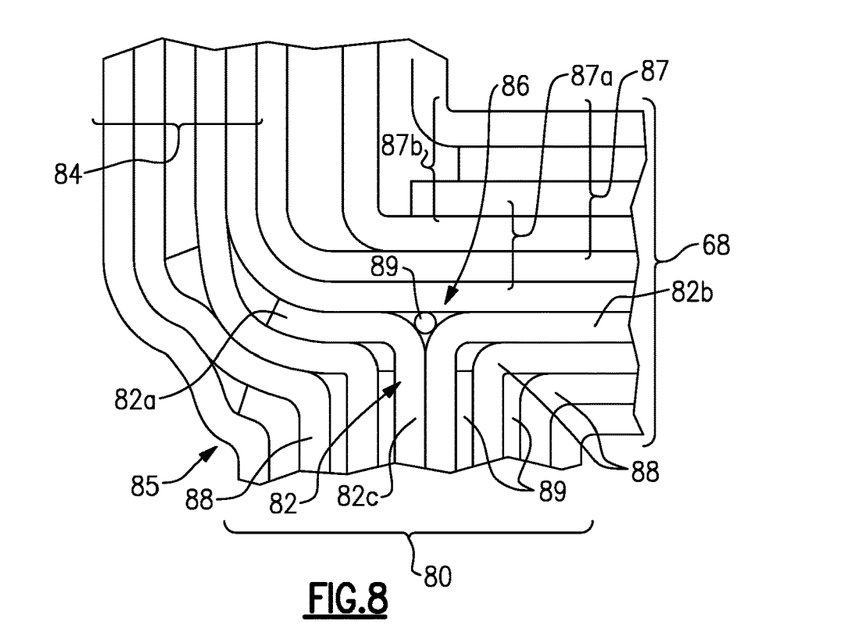
FIG. 8 illustrates a closer view of the fiber ply architecture of another flange of an airfoil fairing.

FIG. 7 shows a closer view of the forward flange 80 of the platform 66 (the aft flange 80 of the platform 66 is of similar architecture), and FIG. 8 shows a closer view of the aft flange 80 of the platform 68. As shown, each of the flanges 80 is formed in part by a portion of the wishbone-shaped fiber layer structure 82 (hereafter "structure 82"). That is, the first arm 82a, the second arm 82b, or the single leg 82c forms at least a portion of the flange 80, while the other of the first arm 82a, the second arm 82b, or the single leg 82c that is not in the flange 80 forms a portion of the platform 66/68. In these examples, the single leg 82c is upstanding and forms a core portion of the flange 80. The single leg 82c extends into the platform 66/68 where the arms 82a/82b split apart and then turn in opposite directions to form portions of the platforms 66/68. A filler (i.e., noodle) 89 may be provided at the split. The upstanding single leg 82c is thus in the plane of the flange 80 and thereby facilitates stiffening and strengthening of the flange 80. The arms 82a/82b provide an integration of the structure 82 into the plane of the platform 66/68, thereby facilitating the anchoring of the flange 80 in the airfoil fairing 62.

Referring again to FIG. 6, the fiber-reinforced composite 65 additionally includes cavity fiber plies 84 that circumscribe the internal cavity 70 so as to define the full circumferential border thereof. For example, the cavity fiber plies 84 are tri-axial braided plies, but may alternatively be another type of woven architecture. In the illustrated architecture, at least a portion of the cavity fiber plies 84 extend into the platform 66/68 and turn (e.g., at 85) to form a portion of the flange 80. In this regard, the cavity fiber plies 84 that turn into the flange 80 extend along the first arm 82a and the single leg 82c of the structure 82 such that the cavity fiber plies 84 are also upstanding with the single leg 82c. At least one of the cavity fiber plies 84 splits from the others and bypasses the flange 80, as represented at 86. The first arm 82a of the structure 82 is disposed in the split such that the first arm 82a is interleaved in the platform 66/68 with the cavity fiber plies 84. Such an interleaving facilitates the tying together of the layers for added strengthening of the airfoil fairing 62 and anchoring of the structure 82.

In the illustrated example, the fiber-reinforced composite 65 additionally includes one or more over-layer plies 87 that wrap around the perimeter of the airfoil section 64. The over-layer plies 87 may be of the same architecture (e.g., braid or harness weave) but more typically will be of different architectures. As an example, one or more over-layer plies 87a are tri-axially braided plies and one or more over-layer plies 87b are harness weave plies (e.g., 8 harness weave). The over-layer plies 87 serve to reinforce the airfoil section 64. At least a portion of the over-layer plies 87 also turn and form a portion of the platforms 66/68.

The flanges 80 may additionally include one or more cover plies 88 that form a portion of the flange 80 and that turn from the flange 80 into the platform 66/68. The cover plies serve to further reinforce the flanges 80 and also integrate the flanges with the platforms 66/68. Additionally, as shown in FIG. 8, the flange 80 may also include one or more filler fiber plies 89 that are interleaved between the cover plies 88. The filler fiber plies 89 may be relatively short and extend only in, or mainly only in, the flange 80. The filler fiber plies 89 serve for additional reinforcement and increase the thickness of the flange 80.

The fiber-reinforced composite 65 is not limited to a particular method of fabrication. As an example, the fiber ply layers described above and laid up around one or more mandrels located in the cavity 70. After lay-up, the fiber ply layers are infiltrated with the matrix material for densification. For instance, for a ceramic matrix, ceramic material is infiltrated into the fiber ply layers by vapor deposition (e.g., chemical vapor deposition). Alternatively, for OMCs and MMCs, organic or metal matrices may be provided by melt infiltration.

Figure 9:
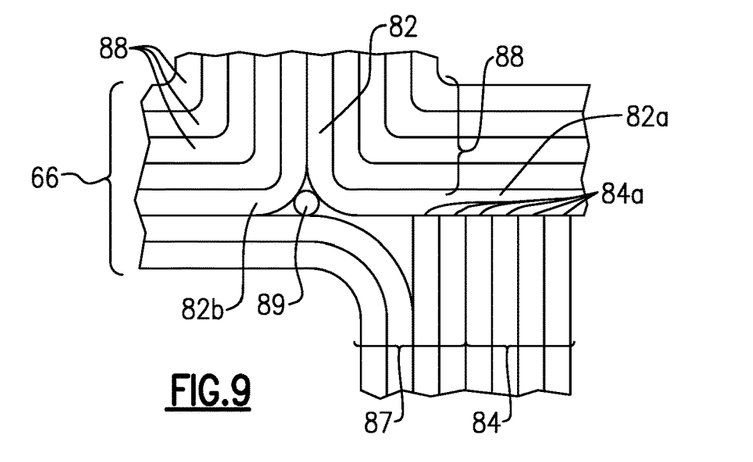
FIG. 9 illustrates another example fiber ply architecture of a flange of an airfoil fairing.

FIG. 9 illustrates an example of a modified architecture for the fiber-reinforced composite 65. Here, rather than the cavity fiber plies 84 extending into the platform 66, at least a portion of the cavity fiber plies 84 have ends 84a that abut the single leg 82a of the structure 82 in the platform 66. For instance, if the cavity fiber plies 84 are relatively stiff, such an architecture avoids having to turn the cavity fiber plies 84 into the platform 66 and flange 80.

Figure 10:
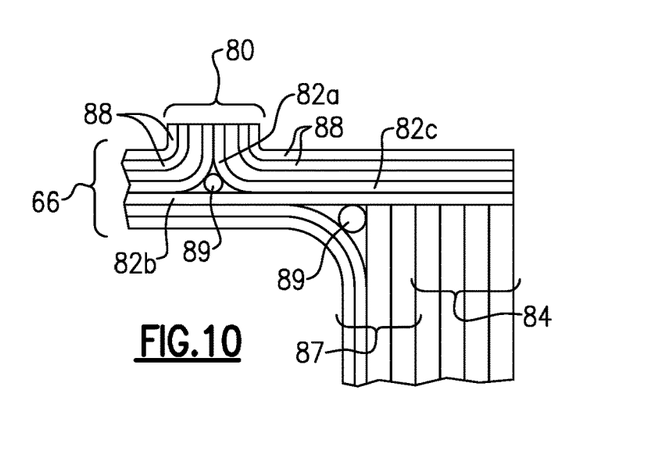
FIG. 10 illustrates another example fiber ply architecture of a flange of an airfoil fairing.
Figure 11:
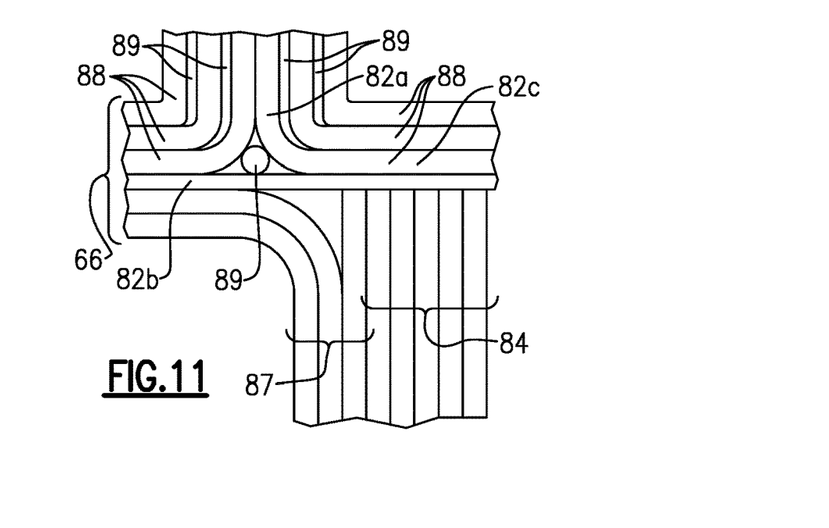
FIG. 11 illustrates another example fiber ply architecture of a flange of an airfoil fairing.

FIG. 10 illustrates another modified architecture of the fiber-reinforced composite 65. This architecture is the same as that of FIG. 9 except that for the structure 82 the arm 82a is upstanding to form a portion of the flange 80 and the single leg 82c is in the plane of the platform 66. The architecture shown in the example in FIG. 11 is the same as that of FIG. 10 except that filler fiber plies 89 are interleaved with the cover plies 88 and arm 82a of the structure 82.

Figure 12:
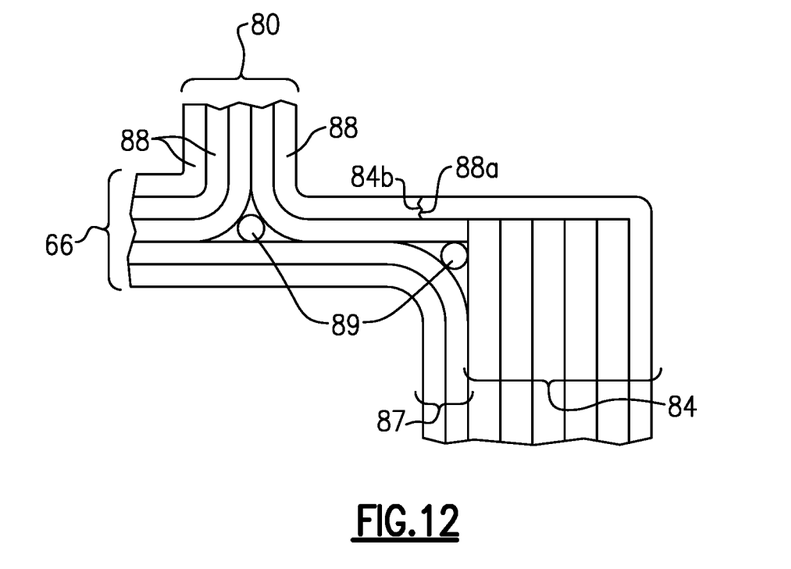
FIG. 12 illustrates another example fiber ply architecture of a flange of an airfoil fairing.

FIG. 12 illustrates an additional modified architecture of the fiber-reinforced composite 65. In this example, the inner-most one of the cavity fiber plies 84 turns into the platform 66 and the remaining cavity fiber plies 84 dead-end at the inner-most one of the cavity fiber plies 84. The inner-most one of the cavity fiber plies 84 extends in the platform 66 and then terminates at a cavity fiber ply terminal end 84b. The end 84b abuts a terminal end 88a of the cover ply 88 to form a butt joint.

Figure 13:
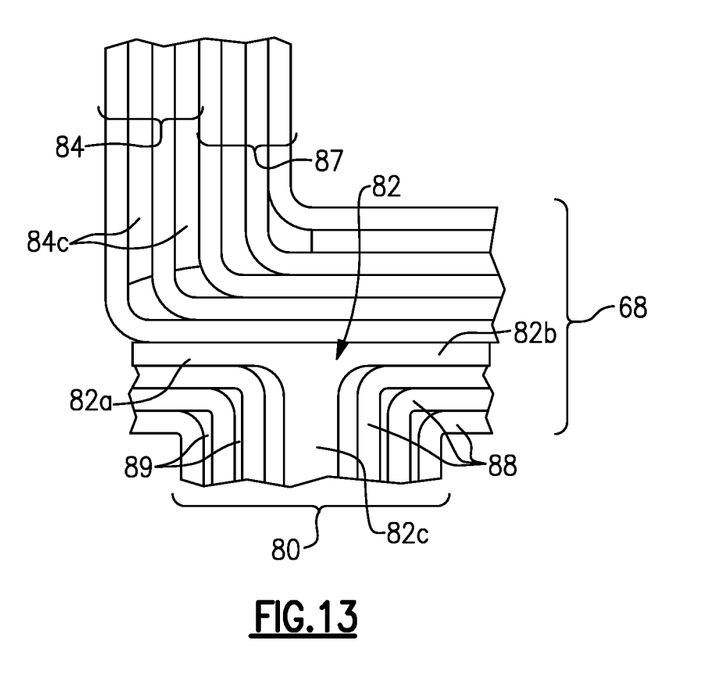
FIG. 13 illustrates another example fiber ply architecture of a flange of an airfoil fairing.

FIG. 13 shows another example of the fiber-reinforced composite 65 that is similar to that of FIG. 8. In this example, however, several of the cavity fiber plies 84c terminate short of the platform 68, while the remaining cavity fiber plies 84 turn into the platform 68.

As can be appreciated from the examples disclosed herein, the flanges 80 are of relatively simple geometry that can be readily formed with upstanding fiber plies of the structure 82 and additional fiber plies as necessary for reinforcement and sizing. Furthermore, the structure 82 permits at least a portion of the flange 80 to be integrated into the platform 66/68, thereby providing an anchoring for enhanced flange strength. Moreover, the flange 80 can be formed with any of a variety of different architectures in order to tailor the flange to the particular implementation and, if necessary, provide flanges of different architectures on the same airfoil fairing.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:
an airfoil fairing having a fairing platform and an airfoil section extending there from, the fairing platform defining a gaspath side and a non-gaspath side,
the fairing platform including a flange projecting from the non-gaspath side,
the airfoil fairing being formed of a fiber-reinforced composite including a wishbone-shaped fiber layer structure having first and second arms that converge and merge into a single leg, the first and second arms being formed of fiber plies comprised of a network of fiber tows, the single leg comprising fiber tows from each of the fiber plies of the first and second arms, the fiber tows of the first arm being interwoven in the single leg with the fiber tows of the second arm, and
the first arm, the second arm, or the single leg forming at least a portion of the flange.

2. The vane arc segment as recited in claim 1, wherein the single leg forms at least a portion of the flange.

3. The vane arc segment as recited in claim 1, wherein the first arm forms at least a portion of the flange and the single leg is in the fairing platform.

4. The vane arc segment as recited in claim 3, wherein the airfoil section includes an internal cavity, the fiber-reinforced composite includes cavity fiber plies that circumscribe the internal cavity so as to define a full circumferential border thereof, and at least a portion of the cavity fiber plies have ends that abut the single leg in the fairing platform.

5. The vane arc segment as recited in claim 1, wherein the first and second arms merge in the fairing platform.

6. The vane arc segment as recited in claim 1, wherein the airfoil section includes an internal cavity, the fiber-reinforced composite includes cavity fiber plies that circumscribe the internal cavity so as to define a full circumferential border thereof, and at least a portion of the cavity fiber plies extend into the fairing platform and turn to form a portion of the flange.

7. The vane arc segment as recited in claim 6, wherein at least one of the cavity fiber plies extends into the fairing platform and bypasses the flange.

8. The vane arc segment as recited in claim 6, wherein the first arm is interleaved in the fairing platform with the cavity fiber plies.

9. The vane arc segment as recited in claim 6, wherein the fiber-reinforced composite includes at least one over-braid fiber ply that circumscribes the airfoil section and turns from the airfoil section into the fairing platform.

10. The vane arc segment as recited in claim 6, wherein the fiber-reinforced composite further includes at least one cover ply that forms a portion of the flange and that turns from the flange into the fairing platform.

11. The vane arc segment as recited in claim 6, wherein at least one of the cavity fiber plies terminates short of the fairing platform.

12. The vane arc segment as recited in claim 1, wherein the airfoil section includes an internal cavity and the fiber-reinforced composite includes at least one cover ply and cavity fiber plies, the at least one cover ply forms a portion of the flange, turns from the flange into the fairing platform, and terminates at a cover ply terminal end, the cavity fiber plies circumscribe the internal cavity so as to define a full circumferential border thereof, and one of the cavity fiber plies extends into the fairing platform and terminates at a cavity fiber ply terminal end that abuts the cover ply terminal end.

13. A gas turbine engine comprising:
a compressor section;
a combustor in fluid communication with the compressor section; and
a turbine section in fluid communication with the combustor, the turbine section having vane arc segments disposed about a central axis of the gas turbine engine, each of the vane arc segments including
an airfoil fairing having a fairing platform and an airfoil section extending there from, the fairing platform defining a gaspath side and a non-gaspath side,
the fairing platform including a flange projecting from the non-gaspath side,
the airfoil fairing being formed of a fiber-reinforced composite including a wishbone-shaped fiber layer structure having first and second arms that converge and merge into a single leg, the first and second arms being formed of fiber plies comprised of a network of fiber tows, the single leg comprising fiber tows from each of the fiber plies of the first and second arms, the fiber tows of the first arm being interwoven in the single leg with the fiber tows of the second arm, and
the first arm, the second arm, or the single leg forming at least a portion of the flange.

14. The gas turbine engine as recited in claim 13, wherein the single leg forms at least a portion of the flange.

15. The gas turbine engine as recited in claim 13, wherein the first arm forms at least a portion of the flange and the single leg is in the fairing platform.

16. The gas turbine engine as recited in claim 15, wherein the airfoil section includes an internal cavity, the fiber-reinforced composite includes cavity fiber plies that circumscribe the internal cavity so as to define a full circumferential border thereof, and at least a portion of the cavity fiber plies have ends that abut the single leg in the fairing platform.

17. The gas turbine engine as recited in claim 13, wherein the airfoil section includes an internal cavity, the fiber-reinforced composite includes cavity fiber plies that circumscribe the internal cavity so as to define a full circumferential border thereof, and at least a portion of the cavity fiber plies extend into the fairing platform and turn to form a portion of the flange.

18. The gas turbine engine as recited in claim 17, wherein at least one of the cavity fiber plies extends into the fairing platform and bypasses the flange.

19. The gas turbine engine as recited in claim 17, wherein the first arm is interleaved in the fairing platform with the cavity fiber plies.

20. The gas turbine engine as recited in claim 13, wherein the airfoil section includes an internal cavity and the fiber-reinforced composite includes at least one cover ply and cavity fiber plies, the at least one cover ply forms a portion of the flange, turns from the flange into the fairing platform, and terminates at a cover ply terminal end, the cavity fiber plies circumscribe the internal cavity so as to define a full circumferential border thereof, and one of the cavity fiber plies extends into the fairing platform and terminates at a cavity fiber ply terminal end that abuts the cover ply terminal end.

\* \* \* \* \*